US006594078B2

United States Patent
Clifton et al.

(10) Patent No.: US 6,594,078 B2
(45) Date of Patent: Jul. 15, 2003

(54) INTERLOCKING MOUNTING PACKAGE HAVING SEPARATABLE CHASSIS FOR USE IN MULTISCREEN PROJECTION DISPLAYS

(75) Inventors: Benjamin R. Clifton, Oregon City, OR (US); Christopher W. L. Brandt, Portland, OR (US)

(73) Assignee: Clarity Visual Systems, Inc., Wilsonville, OR (US)

( * ) Notice: Subject to any disclaimer, the term of this patent is extended or adjusted under 35 U.S.C. 154(b) by 64 days.

(21) Appl. No.: 09/819,137

(22) Filed: Mar. 27, 2001

(65) Prior Publication Data
US 2002/0149543 A1 Oct. 17, 2002

(51) Int. Cl.[7] ............... G03B 21/56; G03B 21/22; G03B 21/28; H04N 5/66; H05K 7/16
(52) U.S. Cl. ............... 359/449; 359/443; 359/460; 353/74; 353/78; 353/94; 348/383; 348/839; 348/840; 361/725; 361/735
(58) Field of Search ............... 359/449, 443, 359/460; 353/74, 78, 94; 348/383, 839, 840; 361/724, 725, 735

(56) References Cited

U.S. PATENT DOCUMENTS

| 5,105,263 | A | | 4/1992 | Shioda ............... 358/29 |
|---|---|---|---|---|
| 5,116,117 | A | | 5/1992 | Miyashita ............... 353/94 |
| 5,299,017 | A | * | 3/1994 | Furuno ............... 348/786 |
| 5,631,715 | A | * | 5/1997 | Kirkpatrick et al. ........ 348/839 |
| 5,654,776 | A | * | 8/1997 | Furuya ............... 348/789 |
| 6,028,701 | A | | 2/2000 | Gulick et al. ............... 359/443 |
| 6,043,797 | A | | 3/2000 | Clifton et al. ............... 345/1 |
| 6,081,375 | A | * | 6/2000 | Furuya et al. ............... 359/460 |

* cited by examiner

Primary Examiner—Russel Adams
Assistant Examiner—Magda Cruz
(74) Attorney, Agent, or Firm—Stoel Rives LLP

(57) ABSTRACT

A stackable mechanical package for a digitally addressed projector (12N) includes a housing portion (22) having top and rear surfaces (44) that are shaped to form a contoured recess (46), and a pedestal portion (20) having bottom and front surfaces (60) that are sized to mate with the contoured recess when the package is in a shippable configuration. When a top side (50) of the pedestal portion is mated to a bottom side (32) of the housing portion, the stackable package is in a first operational configuration. Alternatively, when the stackable package is stacked below another similar stackable package (12F), the shippable configuration further forms a second operational configuration. The stackable package includes legs (24, 26) attached to and protruding from the pedestal portion to support the package apparatus in the first operational configuration or to fasten together the housing and pedestal portions when the package is in the shippable configuration. The fastening employs screws (64) that pass through mating sets of holes (62) in the legs and adjacent housing portions, which are then tightened with nuts (66). Multiple stackable packages may be arrayed vertically and/or horizontally for use in a multiscreen display system (10).

20 Claims, 4 Drawing Sheets

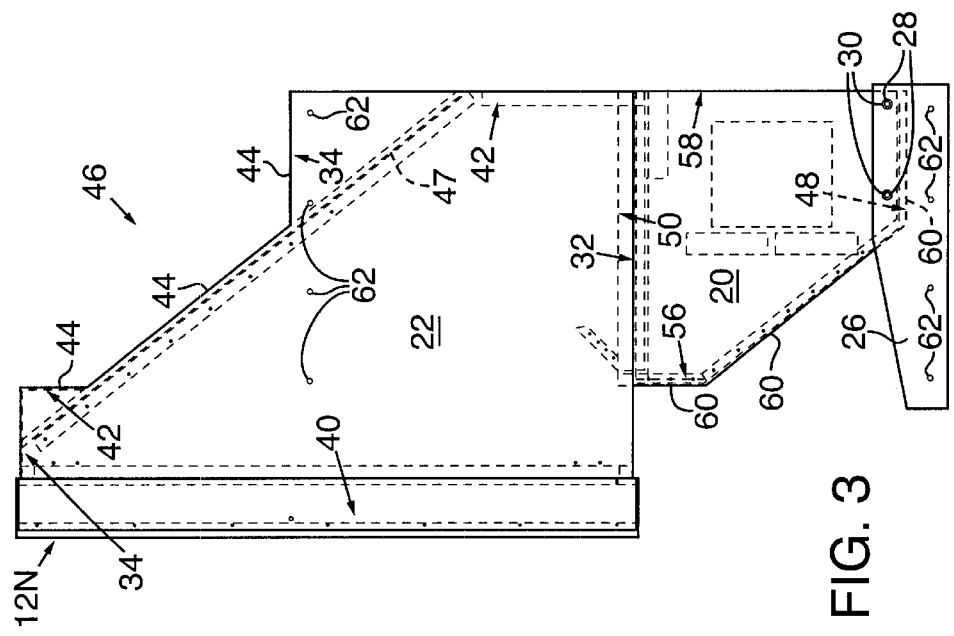
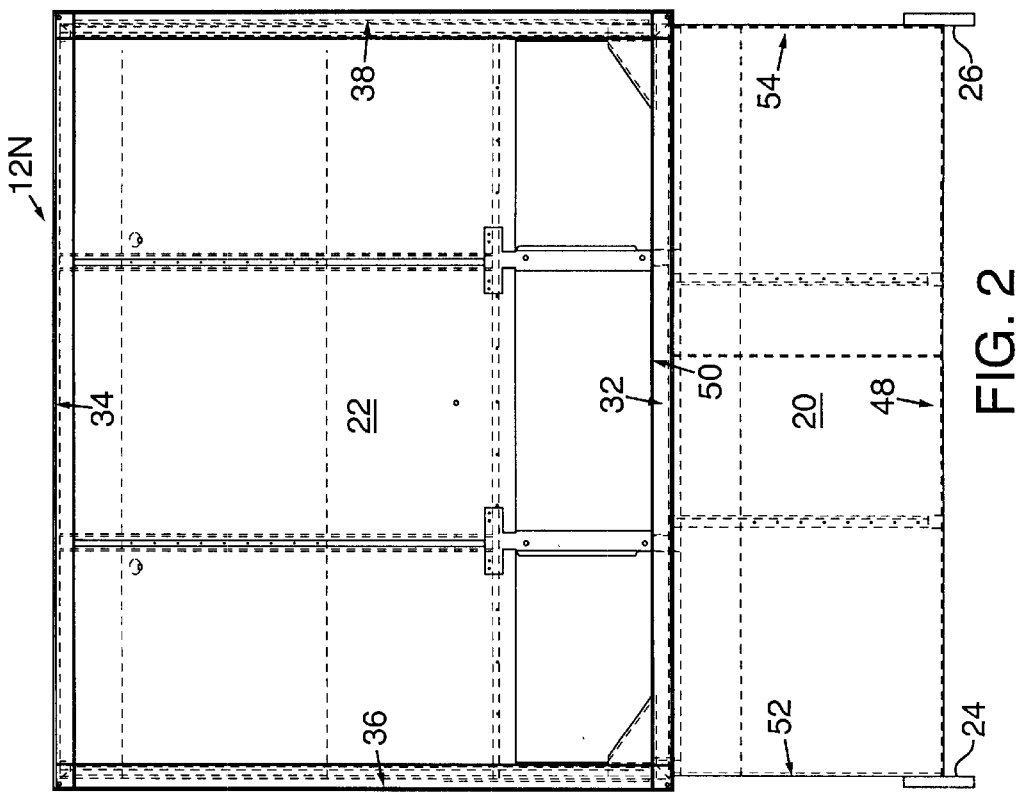

INTERLOCKING MOUNTING PACKAGE HAVING SEPARATABLE CHASSIS FOR USE IN MULTISCREEN PROJECTION DISPLAYS

TECHNICAL FIELD

This invention relates to video display devices and more particularly to a compact, interlocking packaging structure for projection displays that facilitates their usability and serviceability in large-screen and multiscreen applications.

BACKGROUND OF THE INVENTION

There are previously known techniques for employing arrays of cathoderay tube ("CRT") displays in "video walls" and signage applications. Multiscreen displays employ an abutted array of substantially identical display devices that each display a subdivided portion of a total image such that together they display the total image. Because multiscreen displays require that each of the display devices be perceived as part of a whole large display device, it is important to make the boundaries between adjacent display devices appear as inconspicuous as possible. Unfortunately, the human eye is very sensitive to boundary discontinuities, making an acceptably "seamless" multiscreen display very difficult to produce.

This is especially true for arrays of CRT displays because of their curved face plates and nondisplayable borders. CRT projection displays eliminate some of the faceplate and border problems, but are typically heavy and deep because of the 48- to 60-inch-long light paths typically required to project an image on 40- to 52-inch screens. Stacking such CRT projection displays into a multiscreen array typically requires placing the lowermost displays on a stand and securing the individual display packages together with "trunk-style" latches. However, because latches on the innermost displays are not accessible, gravity is often depended on to hold a stack of displays together. The resulting multiscreen CRT display stack may be mechanically unstable, is limited to rear access to inner members of the stack, is typically 48- to 60-inches deep, requires service access space behind the rear of the stack, and is generally wasteful of commercially valuable floor space. A solution to these problems is described in U.S. Pat. No. 6,028,701 for STAIRSTEP INTERLOCK MOUNTING PACKAGE FOR MULTISCREEN PROJECTION DISPLAYS, which is assigned to the assignee of this application and are incorporated herein by reference.

CRT-based multiscreen displays also have image stability and image matching problems, which have been mitigated by digitally addressed, compact, lightweight displays, such as ones described in U.S. Pat. No. 6,043,797 for COLOR AND LUMINANCE CONTROL SYSTEM FOR LIQUID CRYSTAL PROJECTION DISPLAYS, which is assigned to the assignee of this application and are incorporated herein by reference.

Unfortunately, some large-screen configurations of the above-described projection displays have overall heights that exceed allowable maximums for air shipment. Also, fabricating the packages of such large projection displays requires large sheet metal parts, which are costly and difficult to manufacture. Moreover, assembling these large displays can be difficult and hazardous.

What is still needed is an array-stackable display package having all the benefits of the above-described digitally addressed projection displays in a less costly mechanical package that can be air shipped and easily and safely assembled in the field.

SUMMARY OF THE INVENTION

An object of this invention is, therefore, to provide a mechanically stable, array-stackable, packaging apparatus and method.

Another object of this invention is to provide a large-screen projection display package that can be air shipped.

A further object of this invention is to provide a simplified method of assembling arrays of projection displays.

Still another object of this invention is to provide a compact and readily serviceable packaging apparatus for a digitally addressed projector.

A preferred stackable mechanical package for a digitally addressed projector, such as an LCD projector, includes a housing portion having top and rear surfaces that are shaped to form a contoured recess, and a pedestal portion having bottom and front surfaces that are sized to mate with the contoured recess of the housing portion when the package is in a shippable configuration. When the top side of the pedestal portion is mated to the bottom side of the housing portion, the stackable package is in a first operational configuration. Moreover, when the stackable package is stacked below another similar stackable package, the shippable configuration further forms a second operational configuration.

The stackable package further includes legs attached to and protruding from the pedestal portion to support the package apparatus in the first operational configuration or to fasten together the housing and pedestal portions when the package is in the shippable configuration. The fastening preferably employs screws that pass through mating sets of holes in the legs and adjacent housing portions, which are then tightened with associated nuts.

Multiple similar stackable packages may be stacked vertically and/or horizontally in an array of packages suitable for use in a multiscreen display system.

Additional objects and advantages of this invention will be apparent from the following detailed description of a preferred embodiment thereof that proceeds with reference to the accompanying drawings.

BRIEF DESCRIPTION OF THE DRAWINGS

FIGS. 2 and 3 are respective front and right side pictorial elevation views showing structural components of an LCD projection display package of this invention arranged in a first operational configuration.

DETAILED DESCRIPTION OF A PREFERRED EMBODIMENT

Figure 1:
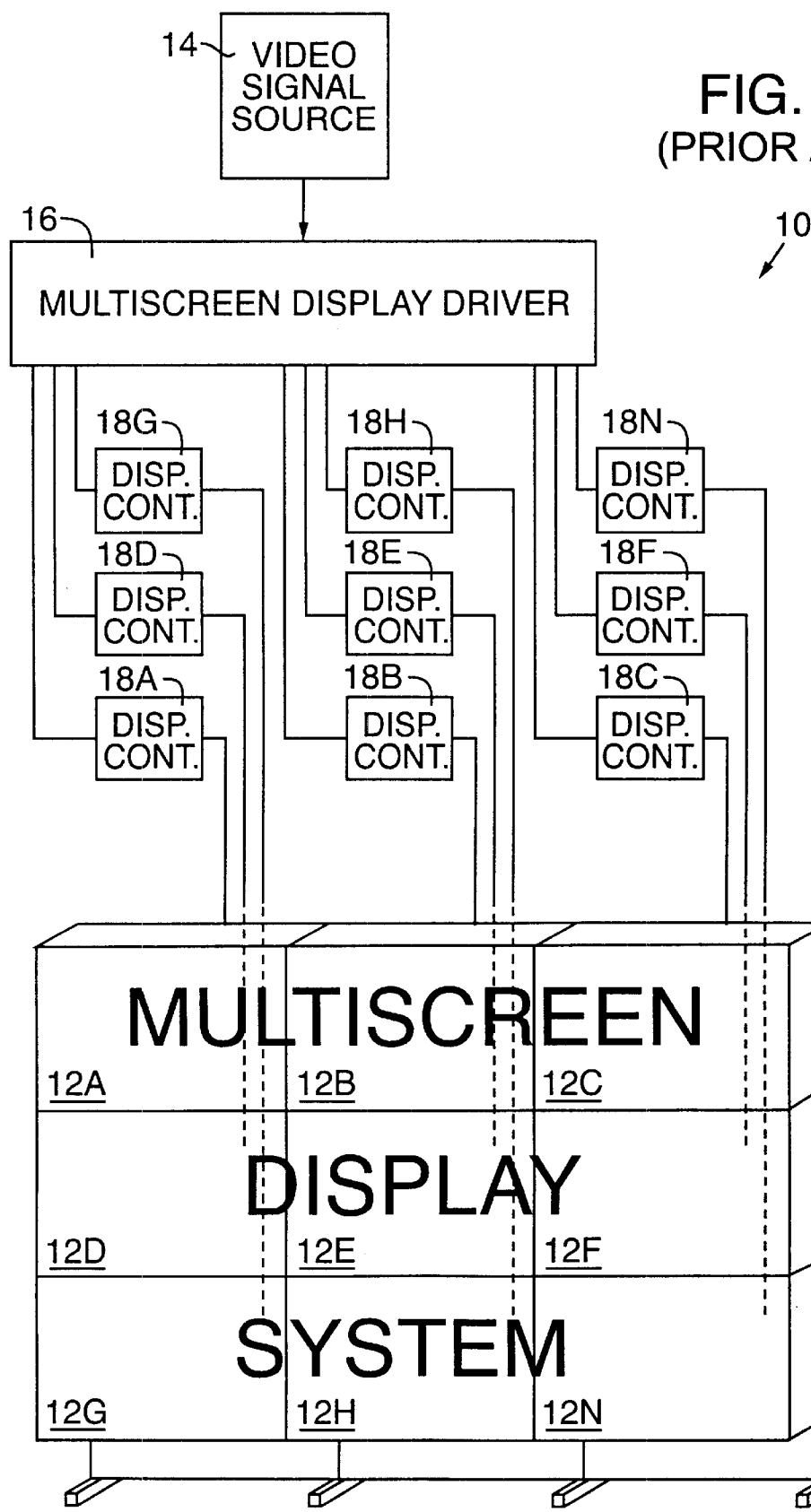
FIG. 1 is a simplified pictorial block diagram of a representative multiscreen display system.

FIG. 1 shows a representative multiscreen display system 10 employing a three-by-three array of LCD projectors 12A, 12B, . . . to 12N (collectively, projectors 12). N may be as small as two and as big as practical to form a very large array of projectors 12. Of course, any of projectors 12 may also be employed in a stand-alone projector configuration and are not limited to employing LCD display devices. A conventional video signal source 14, preferably a personal computer ("PC"), drives a conventional multiscreen display driver 16. Each of projectors 12 is interconnected with multiscreen display driver 16 by associated display controllers 18A, 18B, . . . to 18N that perform LCD projection luminance and color balance functions as described in the above-cited U.S. Pat. No. 6,043,797. Display controllers 18 are preferably integrated within projectors 12. Multiscreen display system 10 substantially seamlessly displays a total image.

FIGS. 2 and 3 show respective front and right side views of a representative one, for example 12N, of projectors 12 of this invention. The mechanical packaging of LCD projector 12N is stackable and includes a pedestal portion 20 and a housing portion 22. Pedestal portion 20 is supported by respective left and right legs 24 and 26 that are attached by screw fasteners 30 threaded into PEM nuts 32 that are pressed into the bottom side margins of pedestal portion 20. Left and right legs 24 and 26 preferably protrude forward from the left and right bottom side margins of pedestal portion 20.

Pedestal portion 20 preferably encloses electronic and optical components, such as a power supply, lamp module, display controller 18N, an LCD module, and related optical components. The top side of pedestal portion 20 includes an opening that mates with a corresponding opening in the bottom side of housing portion 22 to form a first operational configuration of projector 12N as shown in FIGS. 2 and 3. The electronic and optical components slide into the rear of pedestal portion 20 and are, because of the above-described openings, accessible from the front or rear of projector 12N. When projector 12N is in the first operational configuration, the top side of pedestal portion 20 is mated to the bottom side of housing portion 22 by sliding together mating channels and surfaces formed along marginal edges of the top side of pedestal portion 20 and the bottom side of housing portion 22.

Housing portion 22 includes a bottom side 32, a top side 34, a left side 36, a right side 38, a front side 40, and a rear side 42 in which at least the top side 34 and the rear side 42 include surfaces 44 that are shaped to form a contoured recess 46. Housing portion 22 encloses a large fold mirror 47 (shown in dashed lines in FIGS. 3 and 4) and supports on front side 40 a removable projection screen and a frame 72 that are described with reference to FIG. 6.

Figure 4:
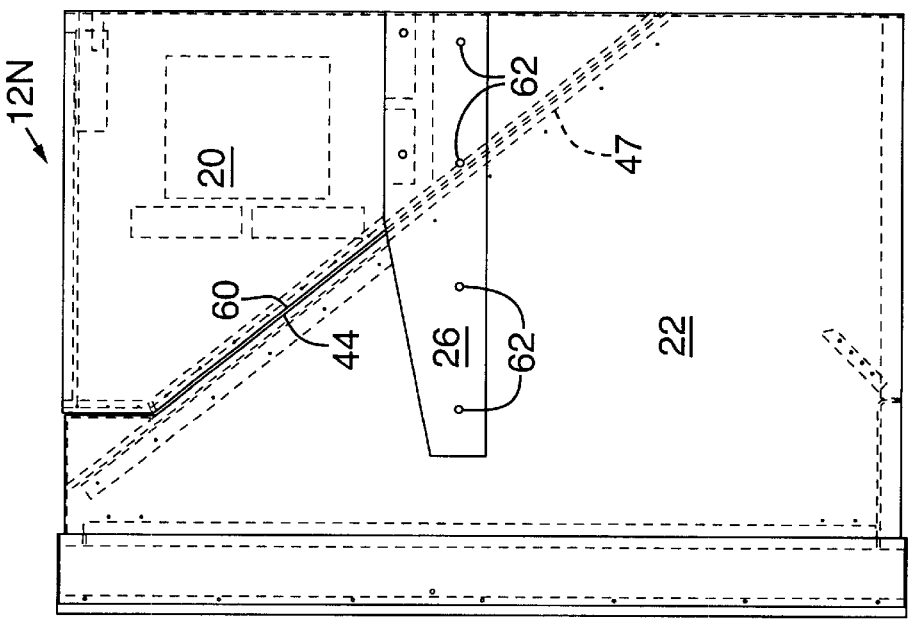
FIG. 4 is a right side view of the LCD projection display package of FIGS. 2 and 3 arranged in a shippable configuration.

Pedestal portion 20 includes a bottom side 48, a top side 50, a left side 52, a right side 54, a front side 56, and a rear side 58 in which at least the bottom side 48 and the front side 56 include surfaces 60 that are sized to mate with contoured recess 46 in housing portion 22, thereby placing projector 12N in a shippable configuration as shown in FIG. 4. When projector 12N is in the shippable configuration, pedestal portion 20 is secured to housing portion 22 by fasteners passing through mating holes 62 formed in left and right legs 24 and 26 and in left and right sides 36 and 38 of housing portion 22.

Figure 5:
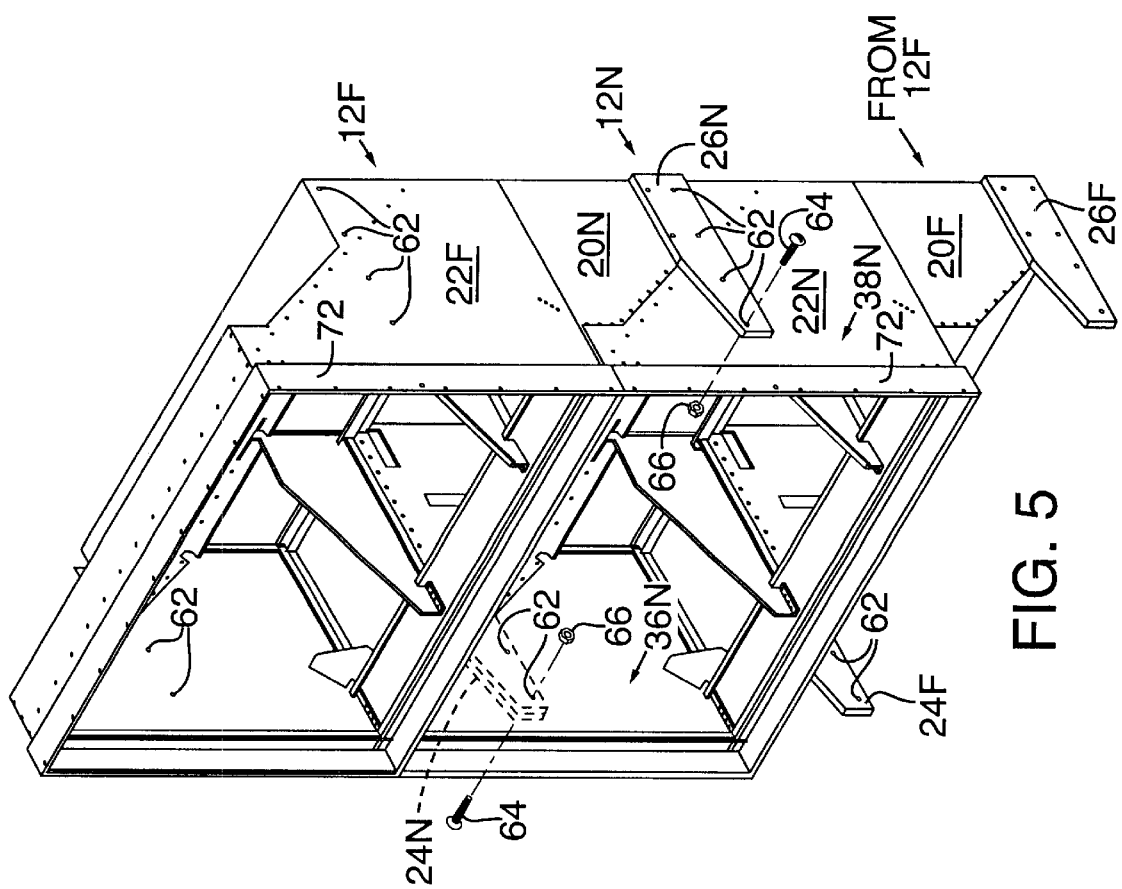
FIG. 5 is an isometric view of a vertically stacked pair of the LCD projection display packages of FIGS. 2–4 in which the lower package is employed in the shippable configuration of FIG. 4, thereby revealing its usability in a second operational configuration.

FIG. 5 shows that when a second substantially identical projector, for example projector 12F (as shown in FIG. 1) is stacked vertically above projector 12N, its shippable configuration further forms a second operational configuration. To achieve the FIG. 5 stacking, projector 12N is removed from its shipping container and retained in the shippable configuration. Projector 12F is removed from its shipping container and separated into its housing portion 22F and pedestal portion 20F. Projector 12N is placed on top of and secured to pedestal portion 20F. Housing portion 22F then is placed on top of and secured to the large flat surface formed by the shippable configuration combination of pedestal portion 20N and housing portion 22N.

Upper projector 12F is preferably secured to lower projector 12N by passing fasteners, such as machine screws 64 (representative ones are shown in exploded view), through mating sets of holes 62 in left leg 24N and left side 36N, and in right leg 26N and right side 38N, and tightening them together with associated nuts 66 (representative ones are shown in exploded view).

The original motivation for the shippable configuration was to reduce the overall height and volume of projector 12 to reduce its shipping cost and allow larger versions of projectors 12 to be air shipped when necessary. A preferred commercial embodiment of projector 12 has a height in the first operational configuration of about 152 centimeters (60 inches), which exceed an allowable air shipping size limit, whereas in the height in the shippable configuration is about 107 centimeters (42 inches), which is within the allowable air shipping size limit. Moreover, even for packages within a hight limit, reducing shipping container volume reduces air shipping costs.

Beyond the original motivation for the shippable configuration, the second operational configuration of projector 12N has further unexpected and advantageous results. When vertically stacking two or more projectors, it was discovered that only one projector required disassembly from its shipping configuration, and that the upper surface of the lower projector is conveniently flat, resulting in faster, simpler, and safer vertical stacking of projectors 12. Of course, projectors already in the first operational configuration can also be stacked.

Figure 6:
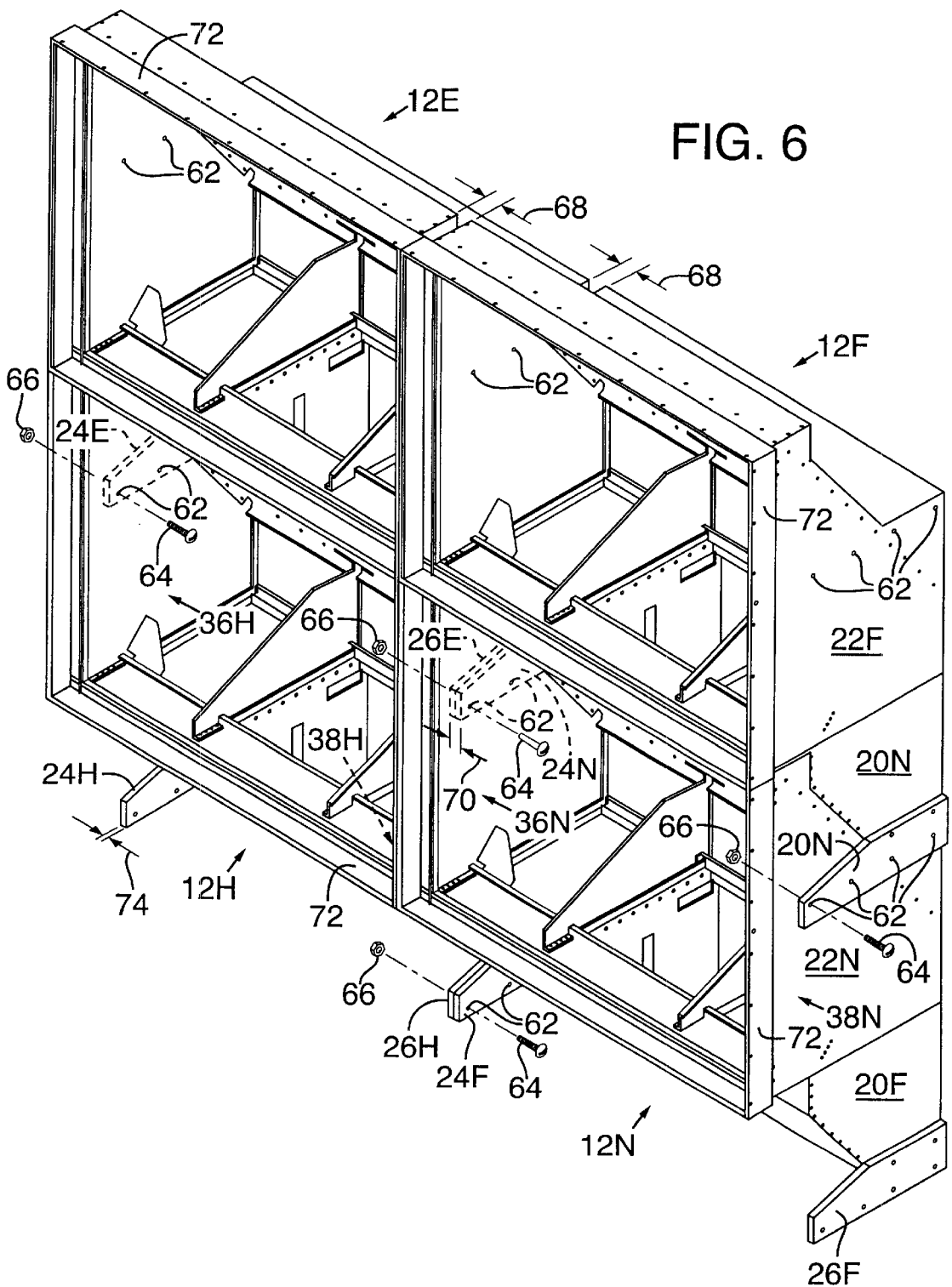
FIG. 6 is an isometric view of a vertically and horizontally stacked array of the LCD projection display packages of FIGS. 2–5 showing fasteners in exploded views to reveal a preferred way of securing together the array of LCD projection display packages.

FIG. 6 shows an array of four of projectors 12, for example projectors 12E, 12F, 12H and 12N (as shown in FIG. 1) in which projectors 12F and 12N are vertically stacked as in FIG. 5, projectors 12E and 12H are a vertically stacked pair of projectors in the first operational configuration, and the resulting two vertical stacks are further secured together horizontally. Each of projectors 12 in the array are positioned such that right sides 38 and 54 of the housing and pedestal portions projectors 12E and 12H are adjacent to associated left sides 36 and 52 of the housing and pedestal portions of projectors 12F and 12N.

Upper projectors 12E and 12F are preferably secured to respective lower projectors 12H and 12N by passing fasteners, such as machine screws 64 (representative ones are shown in exploded view), through mating sets of holes 62 in legs 24 and 26 and respective left and right sides 36 and 38, and tightening them together with associated nuts 66 (representative ones are shown in exploded view).

Left projectors 12E and 12H are preferably secured to respective right projectors 12F and 12N by passing fasteners, such as machine screws 64 (representative ones are shown in exploded view), through mating sets of holes 62 in right side 38H, right leg 26E, left leg 24N, and left side 36N, and tightening them together with associated nuts 66 (a representative four are shown in exploded view). Also, right leg 26H is secured to left leg 24F by passing fasteners, such as machine screws 64 through mating sets of holes 62 and tightening them together with associated nuts 66.

When projectors 12 are horizontally arrayed as shown in FIG. 6, they are separated by a spacing distance 68 that equals a combined thickness 70 of legs 24 and 26. However, front sides 40 (FIG. 3) of housing portions 22 each include a projection screen (not shown) that is held in a thin frame 72 that extends a leg thickness 74 beyond each of left and right sides 36 and 38. Therefore, adjacent thin frames 72 are closely adjacent, thereby providing a substantially seamless expanse for the resulting array of projection screens.

Thin frames 72 and their associated projection screens are removable from front sides 40 of projectors 12, thereby providing a front service access to projectors 12, internal electronic and optical components, as well as holes 62, machine screws 64, and nuts 66.

This invention is less costly and advantageous over some large prior art projection displays because it employs smaller sheet metal parts, simpler assembly methods, and eliminates U-bracket leg "pockets" and slide channels found in some prior art projector packages.

Skilled workers will recognize that portions of this invention may be implemented differently from the implementations described above for a preferred embodiment. For example, the mating and stackable packaging techniques are not limited to use with LCD projection displays and may be employed with micro-mirror reflection displays, CRT displays, nonprojection displays, and many other types of products. When used with displays, this invention may be readily adapted to many different combinations of screen sizes, enclosure and pedestal dimensions, leg sizes, and styles, optical path variations, and display types. Of course, this invention is not limited to use in the arrays of projectors 12 shown in FIGS. 5 and 6, but may be used in any practical array, such as two or more vertically or horizontally arrayed projectors, or a combination thereof.

It will be obvious to those having skill in the art that many changes may be made to the details of the above-described embodiment of this invention without departing from the underlying principles thereof. Accordingly, it will be appreciated that this invention is also applicable to article packages other than those found in multiscreen LCD projection display applications. The scope of the present invention should, therefore, be determined only by the following claims.

What is claimed is:

1. A first stackable package apparatus, comprising:
   a housing portion having bottom, top, left, right, front, and rear sides in which at least the top and rear sides include surfaces that are shaped to form a contoured recess; and
   a pedestal portion having bottom, top, left, right, front, and rear sides in which at least the bottom and front sides of the pedestal portion include surfaces that are sized to mate with the contoured recess of the housing portion when the first stackable package is in a shippable configuration and in which the top side of the pedestal portion is mated to the bottom side of the housing portion when the stackable package is in a first operational configuration,
   wherein when the first stackable package is stacked below a second stackable package that is substantially the same as the first stackable package, the shippable configuration further forms a second operational configuration, the shippable configuration and the second operational configuration being smaller than the first operational configuration and within an allowable size limit for shipping the package apparatus.

2. The apparatus of claim 1 in which the first operational configuration exceeds the allowable size limit for shipping the package apparatus.

3. The apparatus of claim 2 in which the allowable size limit applies to air shipping the package apparatus.

4. The apparatus of claim 1 further including left and right legs attached to and protruding from the pedestal portion and in which the left and right legs are employed in the shippable configuration or the second operational configuration to secure the pedestal portion to the housing portion.

5. The apparatus of claim 1 further including left and right legs protruding from the pedestal portion to support the package apparatus in the first operational configuration.

6. The apparatus of claim 5 in which the second stackable package is in the first operational configuration and is stacked above the first stackable package such that the bottom and front surfaces of the pedestal portion attached to the second stackable package mate with the contoured recess in the housing portion of the first stackable package.

7. The apparatus of claim 6 in which the first and second stackable packages are secured together by fasteners attaching the left and right legs of the second stackable package to the housing portion of the first stackable package.

8. The apparatus of claim 1 in which the second stackable package is in the first operational configuration and is positioned such that the right sides of the housing and pedestal portions of the first stackable package are adjacent to the left sides of the housing and pedestal portions of the second stackable package.

9. The apparatus of claim 8 in which the first and second stackable packages include left and right legs protruding from the respective pedestal portions to support the first and second stackable packages in the first operational package configuration and in which the first and second stackable packages are secured together by mechanically coupling together adjacent legs of the first and second stackable packages.

10. The apparatus of claim 1 in which the first stackable package encloses a projection display and in which the front side of the housing portion includes a front surface comprising a removable projection screen for providing a front service access to the projection display.

11. A method of packaging a first stackable article, comprising:
   providing a housing portion having bottom, top, left, right, front, and rear sides in which at least the top and rear sides include surfaces are shaped to form a contoured recess therein;
   providing a pedestal portion having bottom, top, left, right, front, and rear sides in which at least the bottom and front sides of the pedestal portion include surfaces that are sized to mate with the contoured recess in the housing portion, and the top side of the pedestal portion is adapted to mate with the bottom side of the housing portion;
   forming a first operational configuration of the first stackable article by mating the bottom side of the housing portion to the top side of the pedestal portion; or
   forming a shippable configuration of the first stackable article by mating the bottom and front surfaces of the pedestal portion to the contoured recess in the housing portion, which shippable configuration when stacked below a second stackable article that is substantially the same as the first stackable article further forms a second operational configuration, the shippable configuration and the second operational configuration being smaller than the first operational configuration and within an allowable size limit for shipping the first stackable article.

12. The method of claim 11 further including placing the first stackable article in the shippable configuration and shipping the first stackable article.

13. The method of claim 12 in which the shipping includes air shipping.

14. The method of claim 11 further including:

attaching left and right legs to the pedestal portion;

placing the first stackable article in the shippable configuration; and fastening the left and right legs to the housing portion to secure the pedestal portion to the housing portion.

15. The method of claim 11 further including:

placing the first stackable article in the second operational configuration;

attaching left and right legs to the pedestal portion of at least the second stackable article; and fastening the left and right legs of the second stackable article to the housing portion of the first stackable article to secure the second stackable article to the first stackable article.

16. The method of claim 11 further including:

maintaining the first stackable article in the shipping configuration;

mating the pedestal portion of the second stackable article to the housing portion of the first stackable article; and mating the housing portion of the second stackable article to the pedestal portion of the first stackable article.

17. The method of claim 11 further including attaching left and right legs to the pedestal portion to support the first stackable article in the first operational configuration.

18. The method of claim 11 further including placing the first and second stackable articles in the first operational configuration, and positioning the right sides of the housing and pedestal portions of the first stackable article adjacent to the left sides of the housing and pedestal portions of the second stackable article.

19. The method of claim 18 further including attaching a left leg and a right leg to each of the pedestal portions of the first and second stackable articles, and securing together the first and second stackable articles by mechanically coupling the right leg of the first stackable article to the left leg of the second stackable article.

20. The method of claim 11 in which the first stackable article encloses a projection display and in which the front side of the housing portion includes a front surface comprising a removable projection screen for providing a front service access to the projection display.

* * * * *